United States Patent
Smolarek

(10) Patent No.: US 8,490,848 B2
(45) Date of Patent: Jul. 23, 2013

(54) METHOD AND DEVICE FOR BREAKING SEPARATION OF BEARING CAPS

(75) Inventor: Andreas Smolarek, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 139 days.

(21) Appl. No.: 13/227,308

(22) Filed: Sep. 7, 2011

(65) Prior Publication Data

US 2012/0060340 A1    Mar. 15, 2012

Related U.S. Application Data

(63) Continuation of application No. 10/555,723, filed as application No. PCT/EP2004/002622 on Mar. 12, 2004, now abandoned.

(30) Foreign Application Priority Data

May 7, 2003    (DE) .................................. 103 20 372

(51) Int. Cl.
*B26F 3/00*    (2006.01)
*B23P 19/00*    (2006.01)

(52) U.S. Cl.
USPC ............................. 225/103; 29/426.1; 29/700

(58) Field of Classification Search
USPC ................. 225/100–105, 93, 96; 229/989.08, 229/888.09, 724, 426.1, 700; 227/147, 130
See application file for complete search history.

(56) References Cited

U.S. PATENT DOCUMENTS

2004/0011842 A1 *   1/2004   Hahnel et al. ..................... 225/2

\* cited by examiner

*Primary Examiner* — Ghassem Alie
(74) *Attorney, Agent, or Firm* — Wolf, Greenfield & Sacks, P.C.

(57) ABSTRACT

A device for breaking separation of at least one bearing cap of a corresponding thrust block in the bearing assembly of engine cases provided with bearing bores which are arranged in-line, in particular crankshaft cases for alternative piston engines is provided. The device includes an extension mandrel comprising two half-mandrels insertable into at least one of the bearing bores. The half-mandrels being distant from each other in order to produce breaking separation force between the thrust block and the bearing cap. The bearing cap is clamped in such a way that it is non-rotatable except in a limited manner in the direction of breaking separation between a corresponding half-mandrel and a fixing device.

9 Claims, 6 Drawing Sheets

METHOD AND DEVICE FOR BREAKING SEPARATION OF BEARING CAPS

RELATED APPLICATIONS

This application is a continuation of application Ser. No. 10/555,723, filed Nov. 7, 2005, entitled "Method and Device for Breaking Separation of Bearing Caps", which is a 35 U.S.C. §371 filing of International Application Number PCT/EP2004/002622 which was filed Mar. 12, 2004, which claims priority to German Application 103 20 372.9, filed May 7, 2003 in Germany. The contents of the applications are hereby incorporated by reference.

TECHNICAL FIELD

The present invention relates to a method and device for the breaking or fracture separation of at least one bearing cap from a corresponding thrust block in the bearing assembly of engine cases provided with bearing bores which are arranged in-line, in particular crankshaft cases for reciprocating piston engines.

BACKGROUND

The known types of method and device usually involve the introduction of an extension mandrel comprising two half-mandrels into one or more bearing bores and the fracture separation force for separating the bearing cap from the thrust block is produced by spreading the two half-mandrels apart in a force-actuated manner.

This spreading-apart process is usually brought about by mechanically or hydraulically driving a separating wedge (cf. for example U.S. Pat. No. 4,684,267 or FIG. 1 of DE 44 13 255) or by positioning a hydraulically impacted expander between the half-mandrels. In addition, expanders in the form of knuckle joint assemblies are used (cf. for example DE 199 18 067).

It is also known to clamp the thrust block securely to a stationary support and to "sever" the bearing cap in a controlled manner by introducing a tensile force (cf. FIG. 2 of DE 44 13 255). For this purpose, a tie-rod half is placed within the bearing bore in the area of the bearing cap and this half-tie rod is attached, at both sides of the bearing cap, to tensioning tabs which are connected to a hydraulic pulling means that produces the tensile force needed to "sever" the bearing cap.

As a rule, breaking or fracture separation entails the problem of so-called bending strain. Such deformation phenomena are due to the fact that, during the breaking separation process, the fracture cannot be realized absolutely synchronously across the entire breaking separation face. On the contrary, the fracture begins at a point on the breaking separation face and propagates across the entire breaking separation face with a time delay (in the millisecond range). The already detached part bends up with respect to the part not yet separated, thus causing the breaking separation faces to be no longer fitted precisely together after the fracture has occurred. This effect arises particularly noticeably whenever bearing bores or bearing sleeves, the breaking separation face of which is formed by two spaced-apart surface portions, undergo fracture separation. Workpieces that exhibit these deformation phenomena do not comply with quality-related demands specified in bearing or engine construction and are consequently useless.

The prior art counters this type of bending strain in that the parts to be separated are flexibly pressed together at a specific pre-tension. This pre-tension must, however, be overcome during the breaking separation process, because it counteracts the force of fracture separation. To reduce bending strain to an economically viable degree whenever bearing assemblies undergo fracture separation, it will be necessary in practice to operate at relatively high pre-tensions and consequently with very high fracture-separation forces, too.

SUMMARY OF THE INVENTION

It is the object of the present invention to provide a method and device for the breaking separation of bearing assemblies that permit the fracture face to exhibit enhanced properties.

This object is solved in accordance with the invention by a method and device for the breaking separation of bearing assemblies comprising the features of independent claims 1 and 2. Advantageous extensions are described in the dependent claims.

The present invention is based on the idea of improving the properties of fracture faces during breaking separation in that the bending strains that arise during fracture separation are reduced as far as possible. For this purpose, a completely novel approach is chosen by the invention while retaining the tried-and-tested extension mandrel system that comprises two half-mandrels which can be moved apart. Instead of fixing the corresponding bearing cap by way of a pre-tension, the fixing procedure is performed by a special clamping system. In accordance with the invention, the bearing cap is therefore secured against rotation, but is clamped in a manner that offers a limited degree of free movement—in the direction of breaking separation—between the corresponding half-mandrel and a fixing means.

In principle, this clamping system consists of the half-mandrel that corresponds to the bearing cap, and a fixing means, between which the bearing cap is fixed in a non-movable manner. The crux of the invention lies in the fact that this unit, consisting of the half-mandrel, bearing cap and fixing means, is supported in such a way that although the bearing cap cannot rotate, it can move freely to a limited degree in the direction of breaking separation. This makes it superfluous to use pre-tensions that have to be overcome by the respective breaking separation force. As a result, it is possible to work using relatively low breaking separation forces, which enables the device according to the invention to have a simple and relatively lightweight structural design.

Devices that operate on the basis of the principle described above can as a rule be designed in a very wide variety of ways. Nonetheless, a device that has a particularly simple structure in technical terms, yet which permits reliable and effective clamping, is obtained as a result of the fact that at least two gripping means that can be coupled, on both sides of the corresponding bearing cap, to a half-mandrel corresponding to the bearing cap are provided, and the corresponding bearing cap can be clamped, via a fixing means securely connected to the gripping means, between the corresponding half-mandrel and the fixing means in such a way that a unit consisting of the corresponding half-mandrel with the gripping means as well as the fixing means and the clamped bearing cap is freely movable to a limited degree in the direction of fracture separation, though this unit is supported in a manner secured against rotation. As a result, the corresponding bearing cap is prevented from rotating with respect to the thrust block during fracture separation, thereby largely ruling out bending strain.

In this way, the above-described disadvantages encountered in the prior art can be eliminated and the properties of the fracture surface can be enhanced considerably. It is particularly beneficial for the device according to the invention not to apply any external forces, which counteract the breaking separation process, to those components which are to be separated. This means that those fracture forces which are to be applied are slight, thus facilitating the breaking process and thereby making it even easier to design the device structure.

In principle, the gripping means can be formed and coupled to the corresponding half-mandrel in an arbitrary fashion. It is, however, an advantage for the extension mandrel, especially the corresponding half-mandrel, to comprise at least one recess that is adapted to the gripping means or for it to comprise at least one projection, with which the gripping means engage. This is a simple way of producing a reliable form-fit that helps to ensure the desired, rotationally secured arrangement of bearings.

Particularly in the case of rigid gripping means, an extension of the present invention makes it preferable to provide the corresponding half-mandrel with tangentially extending insertion slots on its periphery at mutually facing sides; these insertion slots can be used to slide the corresponding gripping means over the half-mandrel. Particular preference is given to placing the insertion slots in communication with the at least one recess so that the gripping means can engage rapidly and reliably with the at least one recess via the insertion slots.

In the case of such a structural design, it is an advantage for the at least one recess to be arranged axially adjacent to the insertion slots and for this recess to merge directly into these slots. In such a structural design, the gripping means can slide, through the insertion slots, over the corresponding half-mandrel and the act of coupling can be achieved by simply sliding the half-mandrel in an axial direction. The movement in an axial direction does in fact enable the gripping means to engage with the recesses disposed axially adjacent to the insertion slots, thus causing the gripping means to interlock positively with the corresponding half-mandrel.

A configuration that is particularly simple in technical terms and which exhibits static rigidity is obtained when the gripping means are formed by pincers which preferably each comprise fixed jaws, i.e. jaws which do not move against one another and which, in the region of their ends, have engagement members that face towards one another and which engage with the at least one recess in the corresponding half-mandrel.

The fixing means, too, may be designed in a very wide variety of ways. An especially simple and effective layout is obtained when the fixing means has at least one force-actuated detent. This approach enables the fixing means to be tensioned reliably with the bearing cap that is to be separated and with the corresponding half-mandrel. Preference is given to providing at least two spaced-apart detents (32, 34) that act in a particularly preferred manner upon the bearing cap at that side which is opposite the corresponding half-mandrel. This approach produces a unit that is in itself tensioned and consists of the fixing means, bearing cap that is to be separated and the corresponding half-mandrel, without forces that impede subsequent fracture separation from being introduced into the bearing assembly as a result of tensioning. At the same time, the detents can be realized in a simple and economically viable manner, for example by means of hydraulic cylinders or the like.

DETAILED DESCRIPTION

Figure 1:
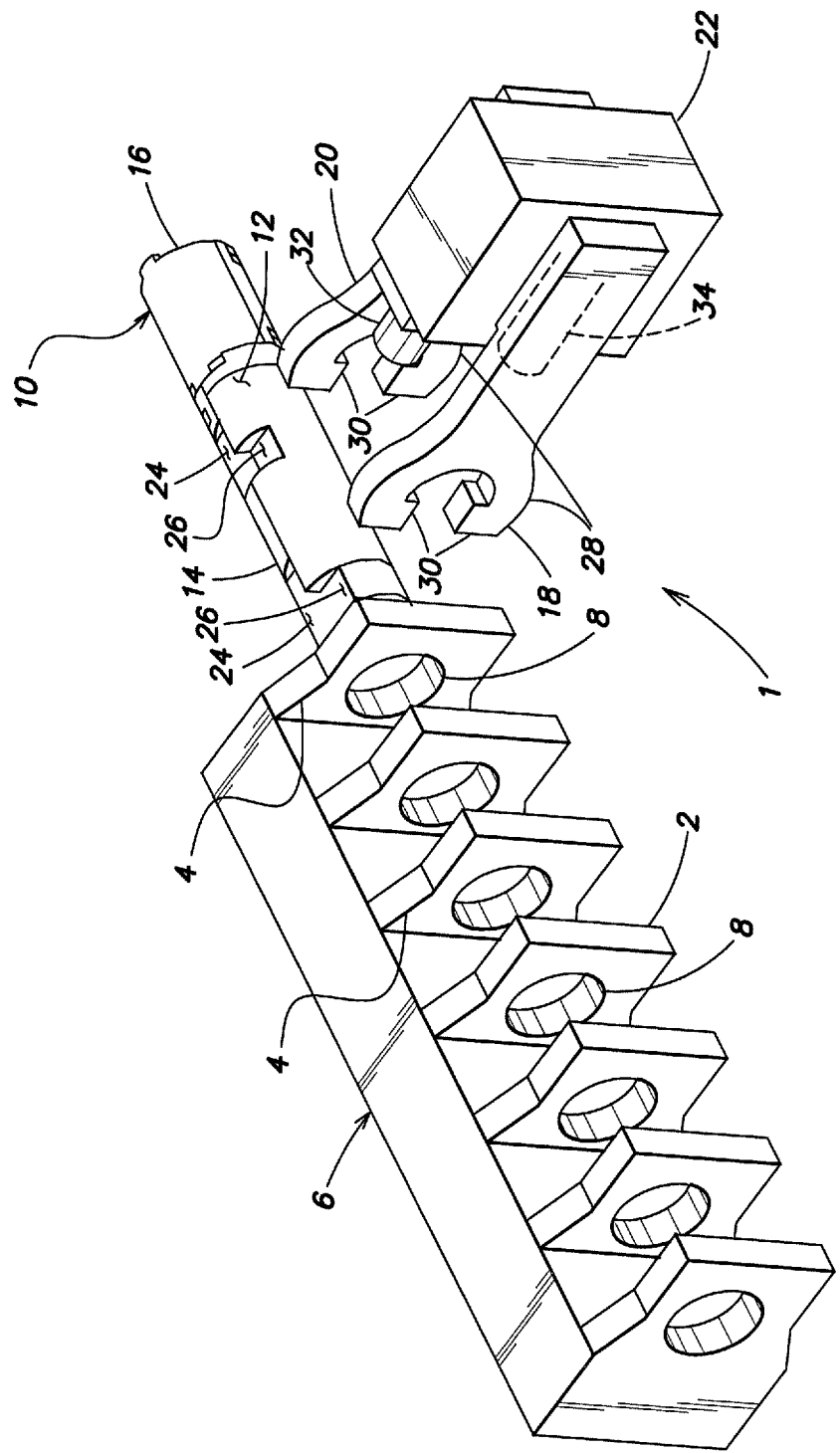
FIG. 1 shows a schematic perspective view of an illustrative embodiment of the breaking separation device in accordance with the invention.

Illustrative embodiments of the present invention will now be described in detail with reference to FIGS. 1 to 6. Identical reference numbers in the drawings each designate identical components.

FIG. 1 depicts schematically a perspective view of one embodiment of a device 1 for breaking separation in accordance with the present invention. As can be identified in FIG. 1, the device 1 in the present embodiment is used to machine, in a breaking separation manner, a crankshaft case 6, as used for example in combustion engines. The crankshaft case 6 has a series of bearing bores 8 that are arranged in-line and which are each enclosed by a thrust block 4 and a bearing cap 2 that are intended to be separated from one another by means of breaking separation. During the breaking separation process, the crankshaft case 6 can be supported in a suitable manner. It must be borne in mind, however, that the present invention is not limited to the illustrated application, but may also be applied to other bearing assemblies or the like.

To begin with, the breaking separation device shown in FIG. 1 comprises an extension mandrel 10 that has two half-mandrels 12, 14 and can be inserted into at least one of the in-line bearing bores 8. An expander 16 for moving the half-mandrels 12, 14 apart is interposed between the half-mandrels 12, 14. The expander 16 may, for example, be formed by a wedge or a hydraulic means that is capable of applying sufficient expansion force to the half-mandrels 12, 14.

The breaking separation device 1 also comprises two gripping means in the form of pincers 18, 20 that can be coupled, at both sides of the corresponding bearing cap 2, to the half-mandrel 12 that corresponds to the bearing cap 2. The pincers 18 are securely connected to a fixing means 22 that is freely movable to a limited degree, but which is supported in a manner that is secured against rotation, in the direction of breaking separation, that is to say in a direction essentially perpendicular to the axis of the bearing bores 8. Such a manner of support can be realized, for example, as a kind of sliding sleeve or the like.

In the present embodiment, the half-mandrel 14, which faces away from the corresponding bearing cap 2, has two recesses 24 so that the half-mandrel 12, which faces towards the corresponding bearing cap 2, protrudes like a projection above the other half-mandrel 14. This makes it possible for the pincers 18, 20 to engage positively with the half-mandrel 12 that is mated with the corresponding bearing cap 2.

Furthermore, the half-mandrel 12 that is mated with the corresponding bearing cap 2 has, at its periphery on mutually facing sides, tangentially extending insertion slots 26 for the pincers 18, 20 that are each in communication with the recesses 24. In more precise terms, the recesses 24, when viewed in the axial direction of the extension mandrel 10, are each located axially adjacent to the insertion slots 26 and merge into them.

In the present embodiment, the pincers 18, 20 are formed such as to have a stationary or rigid geometry. The pincers 18, 20 each comprise two fixed jaws 28 that are arranged essentially in a U shape and each have on their inner periphery a tooth-like engagement member 30 facing towards one another in the case of each pincer 18, 20.

As can be identified in FIG. 1, the thickness of the pincers 18, 20 corresponds essentially to the width of the insertion slots 26, thereby enabling the pincers 18, 20 to be guided onto the extension mandrel 10 such that the engagement members 36 end up form-locked in the region of the recesses 24 and can engage behind the corresponding projection of the half-mandrel 12.

In the present embodiment, the fixing means 22 comprises two force-actuated detents 32, 34, the detent 34 being hidden by the pincer 18 in FIG. 1. The detents 32, 34 are spaced apart from one another and are provided between the pincers 18, 20 such as to face towards the corresponding bearing cap 2. With regard to an even application of load, it is preferred that the detents 32, 34 are located roughly mid-way between the pincers 18, 20 and extend essentially parallel thereto. The force-actuated detents 32, 34 may, for example, be protractable pistons of hydraulic or pneumatic cylinders. It goes without saying, however, that other suitable limit stop members can be used, too, within the framework of the present invention. In addition, it is conceivable that the detents do not move and that the pincers are force-actuated.

The operation of the breaking separation device 1 depicted in FIG. 1 will now be described, by way of example, on the basis of FIGS. 2 to 6, which each schematically illustrate individual steps of one embodiment of the breaking separation method according to the invention, in which the device shown in FIG. 1 is used.

Figure 2:
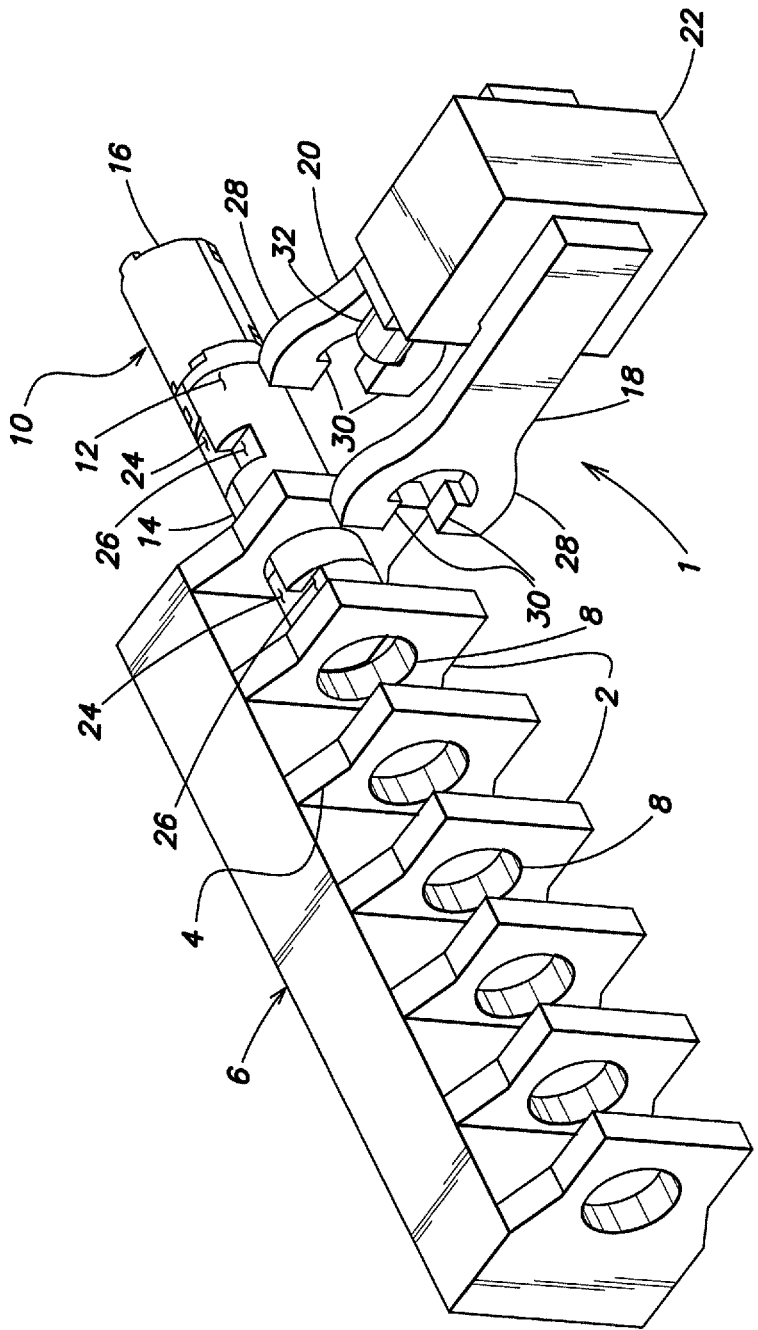
FIGS. 2 to 6 each schematically show individual steps of an illustrative embodiment of the breaking separation method in accordance with the invention, which method makes use of the device shown in FIG. 1.

Starting out from the state shown in FIG. 1, the extension mandrel 10, in its relaxed state, i.e. without any considerable expansion force being applied to the half-mandrels 12, 14 by the expander 16, is first introduced into the first bearing bore 8 in such a way that at least the first insertion slot 26 ends up between the first and the second bearing cap 2 (FIG. 2, with that bearing cap which is located on the right side in the drawings being designated as the first bearing cap). The insertion slots 26 are preferably moved into such a position that they are essentially in alignment with the pincers 18, 20 of the fixing means 22.

Figure 3:
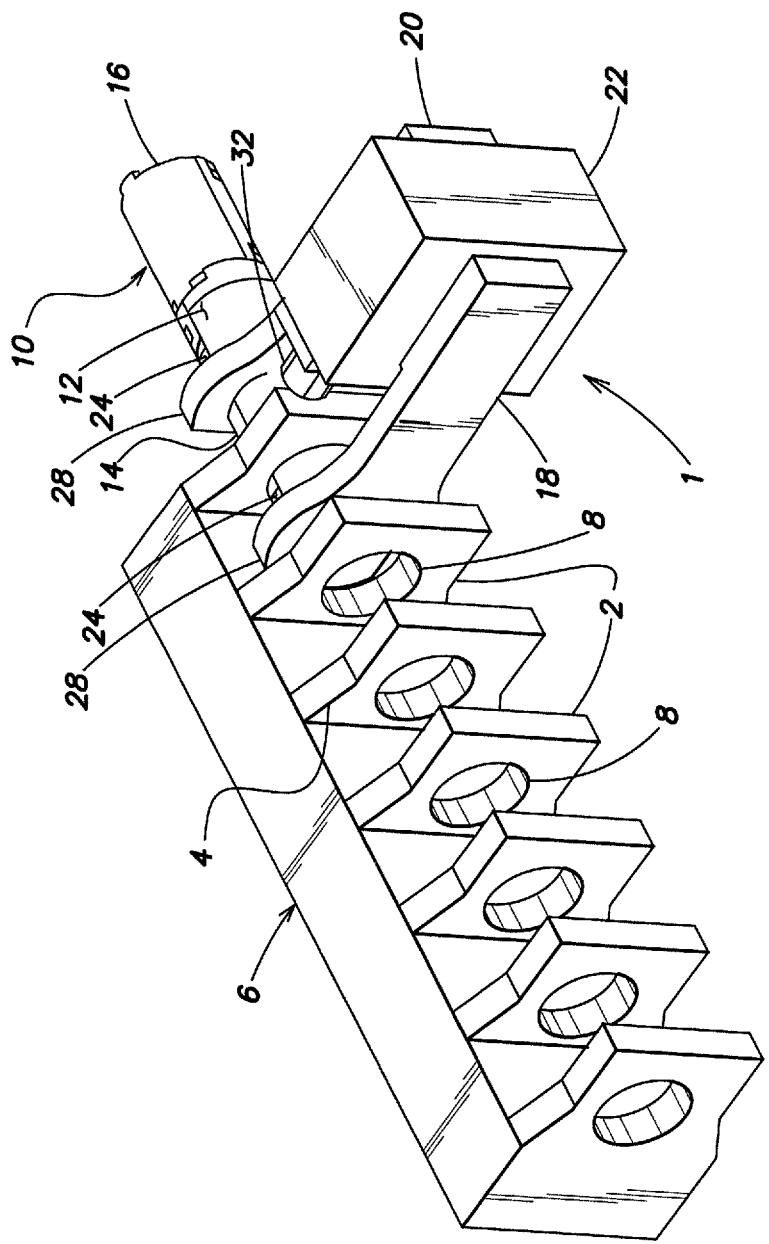

As can be seen in FIG. 3, the securely connected unit consisting of the pincers 18, 20 and the fixing means 22 is now moved towards the extension mandrel 10 and the crankshaft case 6 such that the pincers 18, 20, with their jaws 28 and particularly their tooth-like engagement members 30, plunge into the insertion slots 26. The pincers 18, 20 are moved towards the extension mandrel 10 to such an extent that the tooth-like engagement members 30 end up axially adjacent to the recesses 24.

Figure 4:
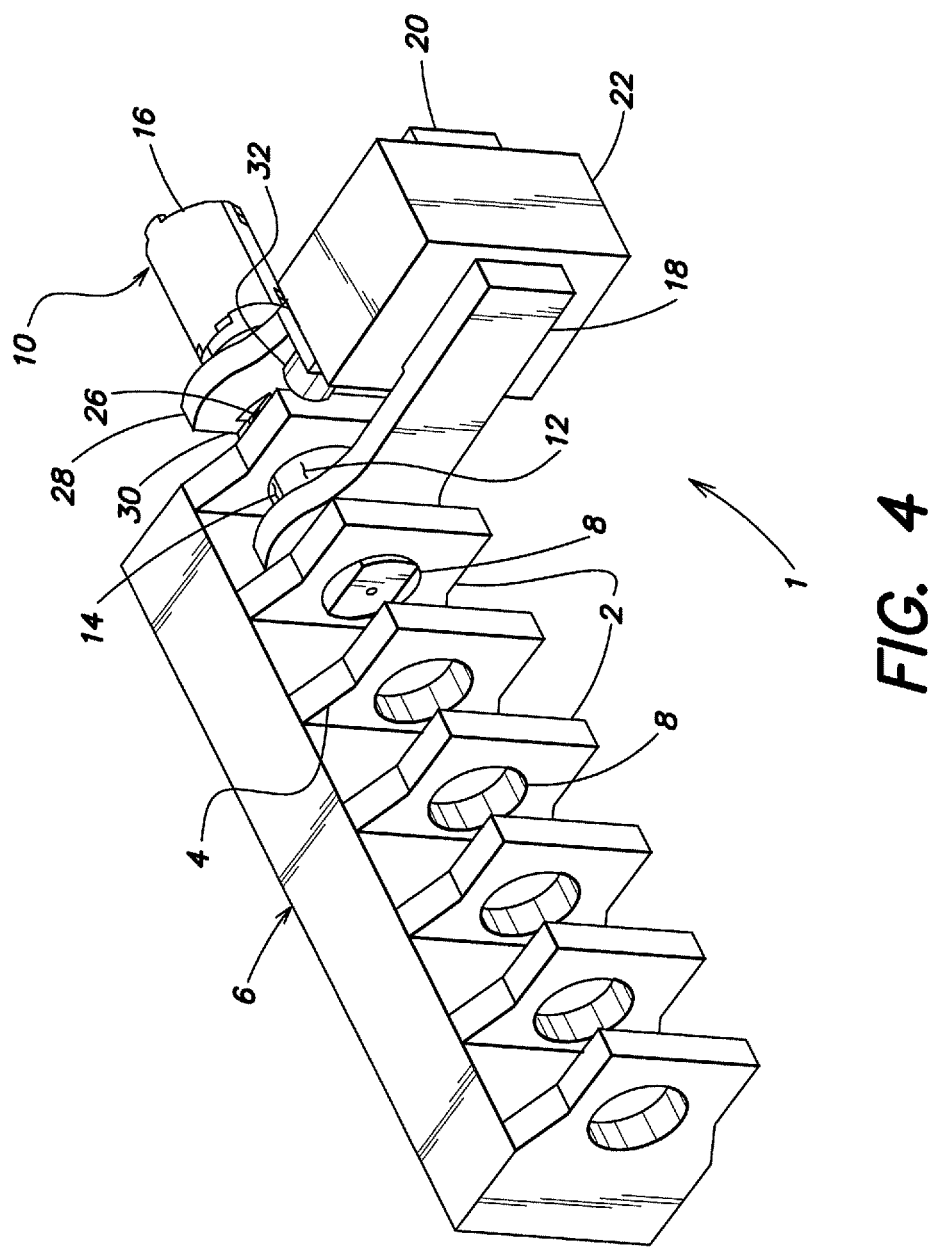

In the next step, as shown in FIG. 4, the extension mandrel 10 is introduced further into the bearing bore 8. The tooth-like engagement members 30 of the pincers 18, 20 assume form-locked engagement with the recesses 24 of the extension mandrel 10 and therefore engage behind the extension sleeve 12 that faces towards the bearing block 2 that is to be separated. In other words, a positive transmission of power is now possible between the extension sleeve 12 that faces towards the bearing cap 2 which is to be separated, and the pincers 18, 20.

Figure 5:
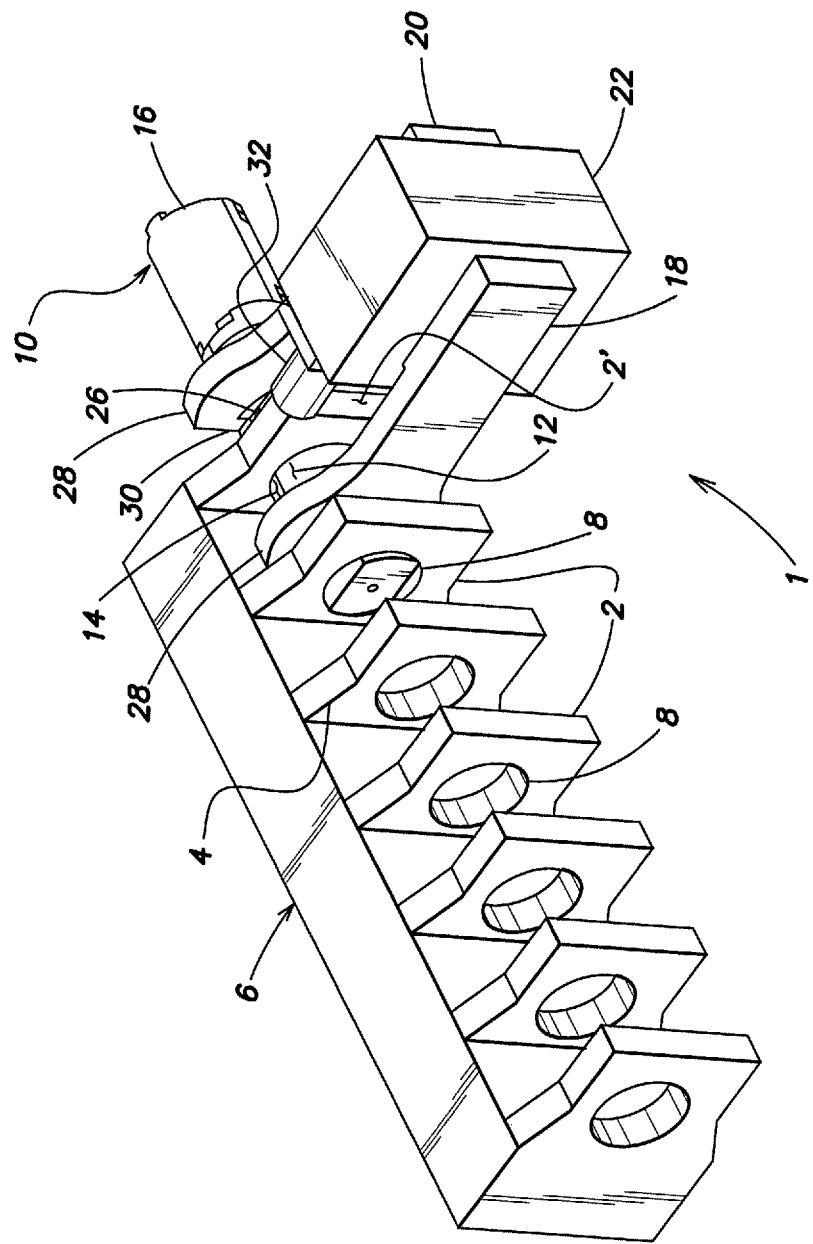

The force-actuated detents 32, 34 are then protracted such as to come in contact with the facing surface 2' of the bearing cap 2 that is to be separated and such as to apply a force thereto (FIG. 5). This produces a pre-tension that securely tensions the fixing means 22, the pincers 18, 20, the extension sleeve 12 that faces towards the bearing cap 2 that is to be separated, and the bearing cap 2 itself that is to be separated, to form a unit. Together with the bearing arrangement of the fixing means 22—which arrangement is secured against rotation, but which moves freely to a limited degree—this approach reduces or largely eliminates, during the fracture separation process, any twisting or bending strain that affects the bearing cap 2 that is to be separated. In this way, a fracture surface can be obtained with a much improved quality and surface structure.

Figure 6:
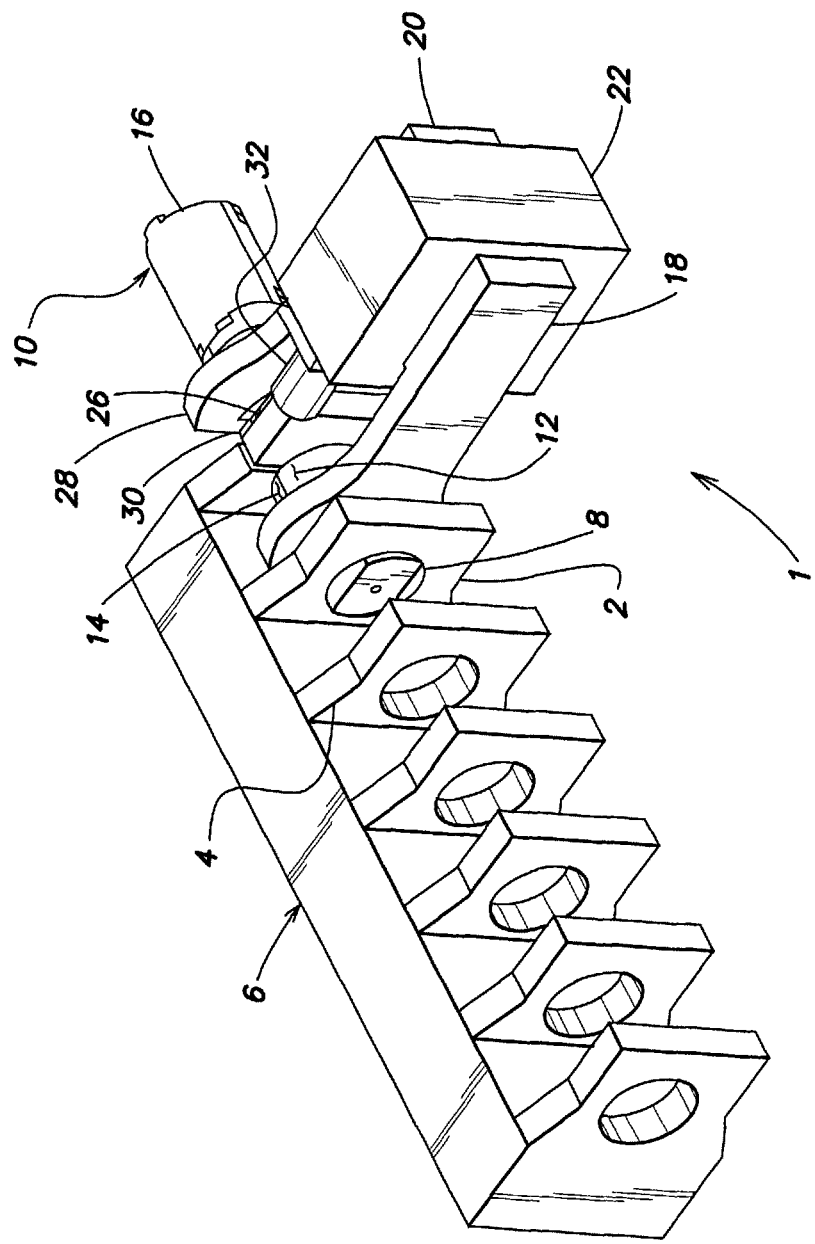

Finally, as can be identified in FIG. 6, the actual breaking separation process is performed. For this purpose, the half-mandrels 12, 14 are moved so far apart by means of the expander 16 until a separation fracture is obtained between the bearing cap 2 and the corresponding thrust block 4. Within the scope of the present invention, it is unnecessary to apply tensile forces via the fixing means 22 to the bearing cap 2 that is to be separated, because, in the present embodiment, the fixing means 22 with the pincers 18, 20 and the detents 32, 34 serves merely to prevent twisting of the bearing cap 2 that is to be separated, but it does not serve to impede or assist the bearing cap's movement in the direction of breaking separation.

After the breaking separation process is complete, the clamping of the separated bearing cap 2 can be released by retracting the detents 32, 34, with the result that the separated bearing cap 2 can be removed and the pincers 18, 20 disengaged from the extension mandrel 10 by retracting same and then retracting the pincers 18, 20. The aforementioned process can then be performed analogously for the next bearing cap 2.

Although the above-described embodiment example of the present invention relates to the breaking separation of a single bearing cap 2, the present invention does, of course, make it possible to separate a plurality of bearing caps 2 from the corresponding thrust block 4 during a breaking separation process. In this respect, it may be useful to provide, for example, a plurality of fixing means 22 having corresponding pincers or to equip a single fixing means 22 with a plurality of pincers and corresponding detents.

What is claimed:

1. A device configured to perform breaking separation of at least one bearing cap from a corresponding thrust block in a bearing assembly of an engine case provided with bearing bores arranged in-line, comprising:
    an extension mandrel insertable into at least one of said bearing bores and said extension mandrel has two half-mandrels;
    an expander for moving said half-mandrels apart, said expander taking effect between said half-mandrels;
    at least two gripping means, each gripping means including one or more protruding engagement members, a protruding engagement member of the one or more protruding engagement members being configured to grip at a respective recess of one half-mandrel corresponding to said at least one bearing cap, while the other half-mandrel is moveable with respect to the gripping means, the recess having a horizontal surface on which a surface of the engagement member engages so as to exert a force in the direction of breaking separation away from the thrust block on said half-mandrel corresponding to said at least one bearing cap, wherein the horizontal surface is configured to match the surface of the engagement member and wherein the horizontal surface and the surface of the engagement member are not curved as the surface of the mandrel;
    one or more detents extending parallel to and provided between a pair of the at least two gripping mean; and
    a fixing means connected to said at least two gripping means and the one or more detents, wherein the at least two gripping means and the one or more detents protrude from the fixing means;
    wherein the one or more detents contact the at least one bearing cap in a protracted position such as to apply a force to the at least one bearing cap to clamp said at least one bearing cap between said corresponding half-mandrel and said fixing means, such that a unit comprising said corresponding half-mandrel, said gripping means, said fixing means and said clamped bearing cap is supported in a freely movable manner to a limited degree, though secured against rotation, in the direction of breaking separation.

2. A device in accordance with claim 1, wherein said half-mandrel corresponding to said bearing cap, comprises at least one recess or at least one projection engageable with said gripping means.

3. A device in accordance with claim 2, wherein said half-mandrel corresponding to said bearing cap comprises, at its periphery on mutually facing sides, tangentially extending insertion slots for said gripping means, said slots being in communication with said at least one recess.

4. A device in accordance with claim 3, wherein said at least one recess, when viewed in an axial direction of said extension mandrel, is positioned axially adjacent to said insertion slots in each case and merges into said slots.

5. A device in accordance with claim 2, wherein said gripping means are formed by a first and a second pincer, each of the first and the second pincers comprise fixed jaws, said jaws having, at their ends, engagement members facing towards one another.

6. A device in accordance with claim 5, wherein said engagement members engage with said at least one recess within said half-mandrel corresponding to said bearing cap or engage behind said at least one projection.

7. A device in accordance with claim 1, wherein said fixing means connected to said gripping means comprises at least one force-actuated detent.

8. A device in accordance with claim 7, wherein at least two detents are spaced apart from one another, said detents acting upon said bearing cap at that side which is opposite said corresponding half-mandrel.

9. A device in accordance with claim 1, wherein the device is configured to perform breaking separation in a bearing assembly of a crankshaft case for a reciprocating piston engine.

* * * * *